May 17, 1960    E. E. MILLER ET AL    2,937,041
DEVICE FOR COUPLING RODS
Filed March 12, 1958
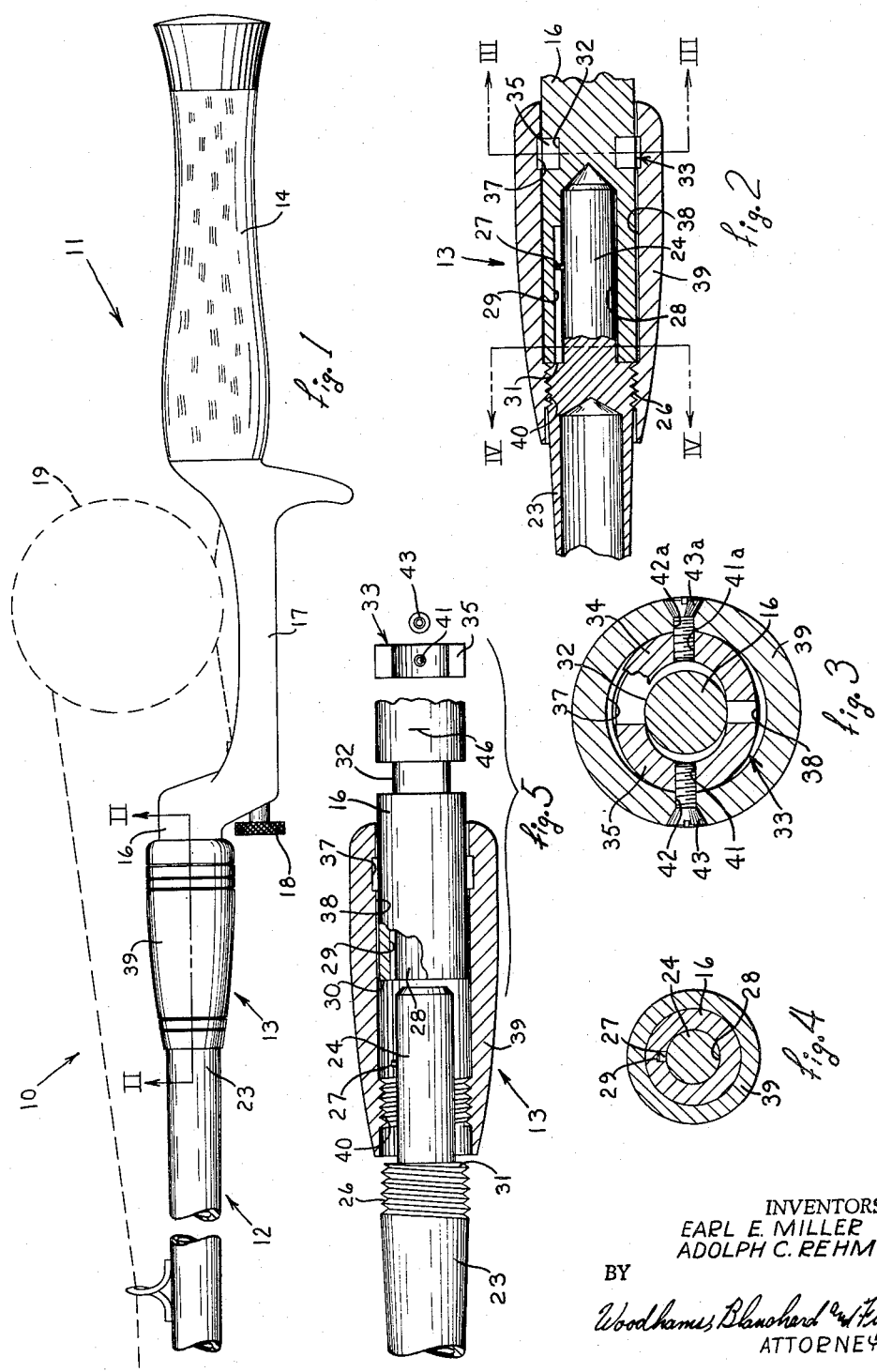
INVENTORS
EARL E. MILLER
ADOLPH C. REHM
BY
Woodhams, Blanchard and Flynn
ATTORNEYS

United States Patent Office 2,937,041
Patented May 17, 1960

2,937,041

DEVICE FOR COUPLING RODS

Earl E. Miller and Adolph C. Rehm, Dowagiac, Mich., assignors to James Heddon's Sons, Dowagiac, Mich., a corporation of Michigan Application March 12, 1958, Serial No. 720,917

2 Claims. (Cl. 287—117)

This invention relates in general to a device for coupling the adjacent ends of a pair of substantially coaxial rods and, more particularly, to a type of such device especially adapted to effect a quick and easy connection between the handle and first section of a jointed fishing rod.

It is well known that fishing rods, particularly of the type used to perform some types of casting operation, are subjected to severe bending moments at the point where the rod joins with the handle. It is also well known that any type of coupling provided for this purpose must be easy to operate and capable of effecting both a secure connection and a speedy disconnection of the rod and the handle. Furthermore, because of the corrosive conditions which are often encountered in the use of fishing rods, it is also desirable to provide a coupling mechanism between the rod and handle which will not be adversely affected if it is permitted to remain in the coupled condition for long periods of time after use or between uses. As evidenced by the substantial number and variety of couplers which are already known to exist for this purpose, many attempts have been made over a long period of time to develop a completely satisfactory coupling device but in pursuance of a continuous effort to improve the product the present invention has been brought forth.

Accordingly, a primary object of this invention is the provision of a device for coupling the adjacent ends of a pair of rods in substantially coaxial relationship, said device being capable of withstanding at least as great a bending moment as the portions of the rod structure adjacent to said device, and which is capable of effecting quick and easy connection or disconnection of the parts coupled thereby.

A further object of this invention is the provision of a coupling device, as aforesaid, which is particularly adapted for use with the adjacent ends of a fishing rod and the removable handle thereof.

A further object of this invention is the provision of a coupling device, as aforesaid, which can be easily and quickly operated manually and which provides not only for a snug engagement of the coupled parts but also serves to break loose the coupled parts in the event that they become corroded or otherwise difficult to disconnect as a result of normal usage.

A further object of this invention is the provision of a coupling device, as aforesaid, which is relatively inexpensive to fabricate and simple to assemble, which is extremely easy to operate and which can be adapted to existing types of fishing rod structures.

A further object of this invention is the provision of a coupling device, as aforesaid, which is completely foolproof in operation, which requires little or no maintenance, and which has a pleasing appearance in combination with the remainder of the fishing rod.

Other objects and purposes of this invention will become apparent to persons acquainted with this type of equipment upon reading the following specification and examining the accompanying drawings, in which:

Figure 1 is a broken side-elevational view of a portion of a casting rod including the handle, the adjacent portion of the rod and the coupling device of the invention.

Figure 2 is a sectional view taken along the line II—II of Figure 1.

Figure 3 is a sectional view taken along the line III—III of Figure 2.

Figure 4 is a sectional view taken along the line IV—IV of Figure 2.

Figure 5 is an exploded, partially broken and partially sectioned view of the coupling device and associated parts substantially as appearing in Figure 2.

For the purpose of convenience in description, the terms "inner," "outer" and derivatives thereof will have reference to the geometric center of the rod coupling device embodying the invention and parts associated therewith. The terms "left," "right" and derivatives thereof will have reference to the corresponding sides of the structures appearing in Figures 1, 2 and 5.

*General description*

In order to meet the objects of the invention, including those set forth above, there has been provided a device for coupling the adjacent end portions of a pair of rod-like members in substantially coaxial relationship. In this particular embodiment, said rod members comprise the handle and the adjacent rod section of a jointed fishing rod assembly. The coupling device includes cooperating means on the adjacent ends of said rod members which permits axially slidable engagement of said members and prevents their relative rotation while so engaged.

A sleeve is mounted on the end of one rod and arranged for rotation with respect thereto, and extends beyond the end of said one rod for threaded reception of the other rod. An internal groove in the sleeve is in register with an external groove in the one rod. A split ring occupies both of said grooves and is rigidly affixed to either the sleeve or the rod, preferably and normally the sleeve.

*Detailed construction*

The fishing rod assembly 10 (Figure 1), herein utilized to disclose the invention, comprises a handle unit 11, a rod unit 12 and the coupling device 13. The handle unit 11 includes a grip portion 14 at one end, a rod portion 16 at the other end and a reel seat 17 between said grip portion and said rod portion. It will be apparent that the grip portion 14 and the reel seat 17 may be reversed in their locations, if desired, and may be conventional in form. A clamping mechanism, including the screw 18, may be provided for removably securing the reel 19 upon the reel seat 17 in a substantially conventional manner.

In general, the rod unit 12 may be of any convenient type which is either jointed or in a single piece, which is either solid or hollow and which is fabricated from any conventional material such as metal tubing, resin impregnated glass fibers, or the like. The lower or butt end portion 23 of the rod unit 12 is preferably solid near its extremity, as shown in Figure 2, and at least a part of such solid portion includes an end pilot 24 of reduced cross-sectional dimension. The butt end portion 23, which is preferably substantially cylindrical, has an external, left hand screw thread 26 adjacent to the end pilot or reduced portion 24. A pin 27 is secured to, and extends radially from, the reduced portion 24 about midway between the ends thereof.

The rod portion 16 of the handle unit 11 (Figures 2 and 5), has in its free end a recess 28 into which the reduced portion 24 of the rod unit 12 is slidably and snugly receivable. In this particular embodiment, the reduced portion 24 and co-operating recess 28 are cylindrical and coaxial with the rod unit 12 and rod portion 16, respectively. Thus, the butt end 23 of the rod unit 12 and the rod portion 16 of the handle unit 11 are preferably substantially coaxial when the reduced portion 24 is thus received into the recess 28.

The wall of the recess 28 has an elongated groove 29, which is parallel with the axis of said rod portion 16 and penetrates the free end thereof for slidable reception of the pin 27 on the reduced portion 24, when said reduced portion is received into the recess 28. The pin 27 and groove 29 are arranged so that they positively prevent relative rotation between the rod unit 12 and rod portion 16 about their common axis, while at the same time permitting an abutting engagement between the free end 30 of the rod portion 16 and the shoulder 31 provided by the junction between the reduced portion 24 and the remainder of the rod unit 12. It will be recognized that the non-rotating feature may be provided in other known ways, such as by means of an out-of-round reduced portion 24 and a correspondingly shaped recess 28 in a substantially well known manner. Furthermore, the reduced portion 24 and recess 28, though here coaxial with the rod portions with which they are associated, may be eccentric with respect to said rod portions without materially changing their purpose or function.

The rod portion 16 of the handle unit 11 (Figures 2, 3 and 5) has an annular external groove 32 which is spaced from the free end of the rod portion 16 preferably a distance slightly greater than the length of the reduced portion 24. A split collar 33, which is comprised of a pair of semi-circular elements 34 and 35 (Figure 3), is snugly, but slidably and rotatably, disposable within the annular groove 32 so that its outside diameter is not materially greater than the adjacent outside diameter of the rod portion 16.

A sleeve 39 is provided with an internal coaxial bore 38 therethrough and said bore has adjacent its righthand end (Figure 2) an internal annular groove 37 therein of the same axial length as that of the groove 32. Said sleeve 39 also has internal threading adjacent its leftward end for engagement with the threading 26 on the butt end portion 23. The rod portion 16 (Figure 5) is cylindrical in this embodiment and rotatably receivable into the bore 38 of said sleeve 39.

The ring elements 34 and 35 (Figures 3 and 5) have threaded, radially disposed openings 41 and 41a preferably about midway between the circumferential ends thereof. Thus, the threaded opening in one of the elements is diametrically disposed with respect to the threaded opening in the other of said elements when said elements are disposed within the annular groove 32, as shown in Figure 3. The sleeve 39 has a pair of diametrically disposed, preferably coaxial, screw openings 42 and 42a through which screws 43 and 43a are respectively and slidably received for threaded engagement with the threaded openings 41 and 41a in the semi-circular elements 34 and 35, respectively.

When the screws 43 and 43a are tight, the elements 34 and 35 are drawn radially outwardly into the internal annular groove 37. However, the depth of said groove 37 is materially less than the radial dimension of said elements 34 and 35 and hence, even when drawn by said screws tightly against the radially outer wall of the internal groove 37, said elements 34 and 35 will continue to extend into the groove 32. Thus, said elements 34 and 35 will prevent relative axial movement between the sleeve 39 and the rod 16 but will permit relative rotational movement therebetween.

In assembly, a mark 46 on the rod 16 will indicate the point which the rightward end of the sleeve 39 should occupy in order to place the grooves 32 and 37 into radial alignment with respect to each other.

It will be observed in Figure 2 that the sleeve 39 telescopes substantial portions of both the rod unit 12 and the rod portion 16 when the coupling device 13 is fully engaged. Thus, bending moments at the joint between the rod unit 12 and the handle unit 11 are resisted not only by the telescoping engagement between the rod unit 12 and the rod portion 16 but also by the overlapping embracing of the sleeve 39 with both the rod unit 12 and the rod portion 16.

*Operation*

Mounting of the sleeve 39 upon the rod portion 16 of the handle unit 11 is accomplished by placing the semi-circular elements 34 and 35 into the annular groove 32 so that they form a collar 33 having an outside diameter about the same as the outside diameter of the rod portion 16 adjacent to the groove 32. A viscous lubricant, such as petroleum jelly, may be placed in the groove 32 before the insertion of the elements 34 and 35. The lubricant not only serves its usual purpose, but also tends to hold the elements 34 and 35 in said groove 32 during the subsequent assembly.

The rod portion 16, including said semi-circular elements 34 and 35, is then inserted into the rightward end of the sleeve 39 containing the annular recess 37, until the rightward end of the sleeve 39 is radially aligned with the mark 46 on the outer surface of said rod portion 17. The annular groove 32 is now radially aligned with the annular recess 37. The sleeve 39 is rotated with respect to the rod portion 16 and the split collar elements 34 and 35 thereon, until the screw opening 42, for example, becomes aligned with one of the threaded openings 41 and 41a in the semi-circular elements. Accordingly, the screw opening 42a will automatically be substantially aligned with the other of said threaded openings 41 and 41a. The screws are then inserted in the respective openings 42 and 42a, and then are threadedly engaged with and screwed into the respectively aligned openings 41 and 41a in the elements 34 and 35 until such elements are drawn snugly into the recess 37 to effect the connection above described.

Connection of the rod unit 12 with the handle unit 11 is commenced by inserting the reduced portion 24 of said rod unit 12 into the leftward end of the sleeve 39 and thence into the open end of the recess 28 until the pin 27 engages the leftward end of the rod portion 16. The rod unit 12 is then rotated with respect to the rod portion 16 until the pin 27 is received into the groove 29, after which said rod unit and rod portion are moved toward each other until the screw thread 44 engages the screw thread 26. The sleeve 39 is now rotated so that the screw threads 34 and 26 cause the reduced portion 24, hence the rod unit 12, to move axially toward the rod portion 16 until the shoulder 31 engages the leftward end of the rod portion 16. The rod assembly 10, insofar as the coupling device 13 is concerned, is now ready for use.

When it becomes desirable to disconnect the rod unit 12 from the handle unit 11, the sleeve 39 is simply rotated in the direction opposite to that which it was rotated for effecting the connection and the rod unit 12 is thereby moved away from the handle unit 11.

The screwthreads 26 and 40 on the rod unit 12 and sleeve 39, respectively, serve not only to hold the handle unit 11 snugly in engagement with the rod unit 12 but also provide a very large mechanical advantage in drawing the reduced portion 24 out from the recess or opening 28. Thus, seizures, such as those produced by corrosion, which may occur between the reduced portion 27 and the walls of the recess 28 during long periods of use or non-use without being separated, are easily and quickly overcome simply by rotating the sleeve 39 in the direction necessary to effect axial movement of the rod unit and handle unit away from each other.

Although a particular preferred embodiment of the invention has been disclosed in detail for illustrative purposes, it will be understood that variations or modifications of such disclosure, which lie within the scope of the appended claims, are fully contemplated.

What is claimed is:

1. A device for coupling substantially coaxially the adjacent end portions of first and second rods, comprising: means on said end portions for effecting slidable overlapping and non-rotatable engagement therebetween; an external thread on the first rod near the end portion thereof; an annular groove in the second rod near the end portion thereof; a sleeve into which said end portions of said rods are slidably receivable, said sleeve having an internal thread near one end thereof engageable with the thread on said first rod, and said sleeve having an internal annular recess radially alignable with, and of axial width equal to, the annular groove in said second rod; a plurality of partially circular elements receivable into the annular groove and the annular recess and substantially radially movable therewithin, said elements being of axial width such that they effect a snug fit with the end walls of both said groove and said recess and said elements having an outside diameter approximately equal to the external diameter of said second rod adjacent to the annular groove therein; and screw means extending through said sleeve for drawing said elements radially outwardly and holding said elements simultaneously within both said groove and said recess and for moving said elements radially inwardly so that same are completely received in said groove whereby said sleeve may be releasably secured to said second rod.

2. A device for coupling substantially coaxially the adjacent ends of a pair of rods, comprising: a first rod having an end portion and an intermediate portion offset from said end portion, said end portion having a coaxial, cylindrical recess in one end thereof and having an annular, peripheral groove adjacent said one end; a second rod having an end portion of reduced diameter slidably received within said recess and having an externally threaded portion of enlarged diameter adjacent said end portion; cooperating key and keyway means in said recess and on said end portion for preventing relative rotation but permitting relative axial movement therebetween; a sleeve into which the adjacent ends of said rods are received, said sleeve having an internal annular recess adjacent one end thereof radially aligned with, and of the same axial width but lesser radial depth as, said annular groove in said first rod; said sleeve having an internally threaded enlarged portion at the other end thereof, said enlarged portion being of lesser internal diameter than said first rod and providing a shoulder against which said one end of said first rod abuts when said annular groove and said recess are radially aligned, said end portion of said second rod being freely receivable through said enlarged portion and said externally threaded portion being threadedly engaged with the threads of said enlarged portion; a pair of substantially semi-circular, annular elements snugly received in said annular groove and said annular recess, said elements when in abutting relationship having an outside diameter substantially equal to the external diameter of said first rod adjacent said annular groove and having a radial thickness such that when said elements are received within said annular recess, the radially inner portion thereof is received within said annular groove; and a plurality of screws extending radially through said sleeve and threaded into said elements for moving said elements radially inwardly and outwardly between a position where they are fully received within said annular groove and a position where they are partially received within both said annular groove and said annular recess.

References Cited in the file of this patent

UNITED STATES PATENTS

| | | |
|---|---|---|
| 365,178 | Gracey | June 21, 1887 |
| 593,562 | Brennan | Nov. 16, 1897 |
| 1,376,780 | Reid | May 3, 1921 |
| 1,442,223 | Knebusch | Jan. 16, 1923 |
| 1,588,128 | Montgomery | June 8, 1926 |
| 1,774,050 | Brown | Aug. 26, 1930 |